United States Patent
Yoshida et al.

(10) Patent No.: US 7,870,783 B2
(45) Date of Patent: Jan. 18, 2011

(54) METHOD FOR MEASURING THE TURBULENCE INTENSITY OF A HORIZONTAL AXIS WIND TURBINE

(75) Inventors: Shigeo Yoshida, Tokyo (JP); Soichiro Kiyoki, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 109 days.

(21) Appl. No.: 12/412,531

(22) Filed: Mar. 27, 2009

(65) Prior Publication Data

US 2009/0241659 A1   Oct. 1, 2009

(30) Foreign Application Priority Data

Mar. 27, 2008   (JP)   .............................. 2008-083727

(51) Int. Cl.
    *G01P 5/02*   (2006.01)
(52) U.S. Cl. .......................... 73/170.07; 290/44; 416/41
(58) Field of Classification Search ........................ None
    See application file for complete search history.

(56) References Cited

U.S. PATENT DOCUMENTS

| | | | | |
|---|---|---|---|---|
| 2,749,750 A | * | 6/1956 | Hastings | ................... 73/170.07 |
| 6,320,272 B1 | * | 11/2001 | Lading et al. | ................... 290/44 |
| 6,938,472 B2 | * | 9/2005 | Kaushik et al. | ................ 73/187 |
| 2006/0140764 A1 | * | 6/2006 | Smith et al. | ................... 416/103 |
| 2007/0086893 A1 | * | 4/2007 | Pedersen | ...................... 416/61 |
| 2009/0060740 A1 | * | 3/2009 | Stiesdal et al. | ................ 416/41 |
| 2010/0090463 A1 | * | 4/2010 | Nies et al. | ...................... 290/44 |

FOREIGN PATENT DOCUMENTS

| | | |
|---|---|---|
| JP | 2005-61963 | 3/2005 |
| JP | 2006-329107 | 12/2006 |

* cited by examiner

*Primary Examiner*—Andre J Allen
(74) *Attorney, Agent, or Firm*—Haynes and Boone LLP

(57) ABSTRACT

The present invention provides a method for measuring the turbulence intensity of a horizontal axis wind turbine that is capable of accurately obtaining the value of the turbulence intensity without the effect of the rotor and by taking into consideration the motion of the nacelle. In the method for measuring the turbulence intensity of a horizontal axis wind turbine, with the nacelle located on the upwind side of the rotor of the horizontal axis wind turbine, measurement values are obtained from an anemometer that is located on the nacelle and an acceleration sensor that is fastened to the nacelle, and the absolute value of the turbulence intensity is calculated based on the measurement values from the anemometer and the measurement values from the acceleration sensor. As a result, it is possible to accurately calculate the absolute value of the turbulence intensity that includes the effect of the movement of the nacelle.

5 Claims, 8 Drawing Sheets

METHOD FOR MEASURING THE TURBULENCE INTENSITY OF A HORIZONTAL AXIS WIND TURBINE

CROSS REFERENCE TO RELATED APPLICATIONS

This application claims priority under 35 U.S.C. 119 based upon Japanese Patent Application Serial No. 2008-083727, filed on Mar. 27, 2008. The entire disclosure of the aforesaid application is incorporated herein by reference.

FIELD OF THE INVENTION

The present invention relates to a method for measuring the turbulence intensity of a horizontal axis wind turbine.

BACKGROUND OF THE INVENTION

As is well known, so-called horizontal axis wind turbines are used broadly in wind-powered electric power generating equipment. Typically the horizontal axis wind turbine is structured comprising a rotor to which at least blades are attached radially from a hub, a nacelle wherein a rotor is supported rotatably through a main axis that extends in essentially the horizontal direction, to which the hub is attached, and a tower that supports the nacelle rotatably in the yaw direction, and which is disposed in essentially the vertical direction.

In addition, a yaw driving means capable of drive-controlling the yaw rotation of the nacelle, and a control means such as a yaw brake that brakes the yaw rotation, or a main shaft brake that brakes the rotation of the rotor have conventionally been employed in a horizontal axis wind turbine. Moreover, horizontal axis wind turbines having means for controlling the pitch angle of the blades are also being used.

One kind of horizontal axis wind turbine is a downwind type of horizontal axis wind turbine that is constructed such that when the force of the wind on the blades rotates the rotor, the rotor is located further on the downwind side than the tower. On the other hand, an upwind type of horizontal axis wind turbine is constructed such that when the force of the wind on the blades rotates the rotor, the rotor is located further on the upwind side than the tower. In Japanese Patent Application Publication No. 2005-61963 and Japanese Patent Application Publication No. 2006-329107 a downwind type of horizontal axis wind turbine is disclosed in which a anemometer is provided in the nacelle.

The amount of electric power that is generated by wind-power generation and the cost of that electric power strongly relies on the scale of the wind turbine and the wind speed, so there is a trend to continuously increase the size of the wind turbines and to collectively install wind turbines in large open areas where there are high wind speeds as wind farms. Japan is a mountainous, narrow country comprising densely populated areas, so land that is suitable for wind-power generation is spread over complicated geography such as hills.

Furthermore, the durability and the performance of a wind turbine are greatly affected by the turbulence intensity. When the intensity of the turbulence is greater than what the wind turbine was designed for, there is a tendency for fatigue loading to increase, which causes an increase in fatigue damage and a drop in durability.

In addition, from the aspect of performance, there is a tendency that the output near the rated output will be decreased. Wind farms mentioned above, and environments having complicated geography tend to increase the intensity of the turbulence, so when evaluating the durability and performance of a wind turbine, in addition to knowing the wind speed at each wind turbine location, it is also essential that the intensity of the turbulence at each location be known.

Normally, a nacelle anemometer that is located on the nacelle is only used when starting or stopping control of the wind turbine, however, the anemometer is also often used in evaluation of the performance.

However, it is necessary that the wind speed characteristics that must be obtained for the design of the wind turbine be aimed at the airflow to the rotor.

Therefore, conventionally, in order to obtain the value of the wind speed of the airflow to the rotor of the wind turbine, a mast (hereafter, referred to as a reference mast) is installed at a location with a high certainty of having the same wind conditions as the wind turbine, and an anemometer that is placed on the mast at a height that is nearly the same height as hub of the wind turbine is used.

The average wind speed in the case of a nearly horizontal wind, can be corrected to an equivalent to the average wind speed of air flowing to the rotor by taking a correlation between the wind speed that is measured by the anemometer on the nacelle during test operation, and the wind speed that is measured by the anemometer on the reference mast.

The turbulence intensity as well, can feasibly be corrected to an equivalent to the turbulence intensity of the airflow to the rotor by taking the correlation between the wind speed that is measured by the anemometer on the nacelle during test operation, and the wind speed that is measured by the anemometer on the reference mast.

However, a normal upwind type of horizontal axis wind turbine has an anemometer that is located on the downwind side of the rotor, so it is not possible to obtain effective data for the turbulence intensity. In other words, it is not possible to evaluate the output and durability while taking into consideration the intensity of the turbulence.

Therefore, the inventors of the present invention experimented with measuring the turbulence intensity of airflow to the rotor by using an anemometer on a nacelle that is located on the upwind side of the rotor of a downwind type of horizontal axis wind turbine.

The nacelle is moved by the wind that the wind turbine receives. While the nacelle is moving, the values obtained from the anemometer on the nacelle deviates from the value that is measured when the nacelle is in a non-moving state, or in other words, deviates from the absolute value by the amount of the speed of movement of the nacelle. However, movement of the nacelle is unavoidable during measurement. Therefore, even when obtaining the value of the absolute turbulence intensity, it is necessary to take into consideration the effects of movement of the nacelle with respect to the measured value from the anemometer on the nacelle.

Taking the problems of the related art into consideration, the present invention aims to provide a method for measuring the turbulence intensity of a horizontal axis wind turbine that is capable of more accurately obtaining the absolute value of the turbulence intensity where the effect of the rotor is small and the effect of the movement of the nacelle is taken into account.

SUMMARY OF THE INVENTION

According to the first aspect of the present invention for solving the problems described above, there is provided a method for measuring a turbulence intensity of a horizontal axis wind turbine, comprising the steps of:

obtaining measurement values simultaneously from both an anemometer that is located on an upwind side of a rotor of said horizontal axis wind turbine and a sensor that measures a motion of said anemometer; and in a process of calculating the turbulence intensity based on the measurement value of a wind speed by said anemometer, removing, based on the measurement value from the sensor, a portion of change in the measurement value of the wind speed from said anemometer caused by the motion of said anemometer and calculating the turbulence intensity.

According to the second aspect of the present invention, there is provided the method for measuring the turbulence intensity of the horizontal axis wind turbine of the first aspect, wherein the horizontal axis wind turbine is a downwind type wind turbine having a nacelle that is located on the upwind side of the rotor, and the anemometer is located on the nacelle.

According to the third aspect of the present invention, there is provided the method for measuring the turbulence intensity of the horizontal axis wind turbine of the second aspect, wherein the sensor that measures the motion of the anemometer is an acceleration sensor that is located on the nacelle.

According to the fourth aspect of the present invention, there is provided the method for measuring the turbulence intensity of the horizontal axis wind turbine of the first aspect, wherein the horizontal axis wind turbine is an upwind type of wind turbine having a nacelle that is located on a downwind side of the rotor.

According to the fifth aspect of the present invention, there is provided the method for measuring the turbulence intensity of the horizontal axis wind turbine of the third aspect comprising the steps of:

obtaining wind velocity data from said anemometer and acceleration data from said acceleration sensor simultaneously at a specified sampling rate over a specified time period;

calculating an average value and a standard deviation of said wind speed data for each specified continuous time period;

calculating a standard deviation of the speed of the anemometer at a time period that is same as said each specified time period based on said acceleration data;

performing a correction by subtracting the standard deviation of the speed of said anemometer from the standard deviation of said wind speed data to obtain a corrected standard deviation; and dividing said corrected standard deviation by the average value of said wind speed data and taking the result to be the value of said turbulence intensity.

With the present invention, there is an advantage in that wind speed values are obtained from an anemometer that is located on the upwind side of the rotor, so there is little effect from the rotor, and it is possible to correct the turbulence intensity based on the wind speed values and simultaneously measured values from an acceleration sensor, thus making it possible to accurately calculate the absolute value of the turbulence intensity that includes the effect of the movement of the nacelle.

DETAILED DESCRIPTION OF THE INVENTION

The preferred embodiment of the present invention will be described below with reference to the accompanying drawings. The present invention is not limited to the embodiment described below.

Figure 1:
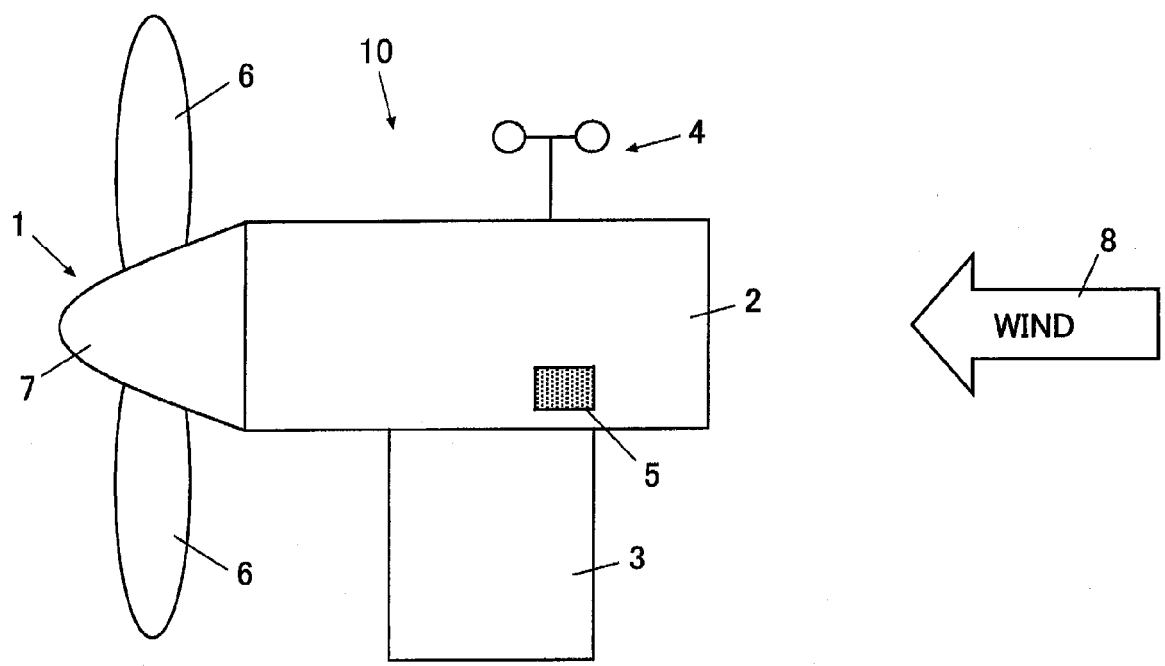
FIG. 1 is a schematic drawing showing the configuration of the horizontal axis wind turbine of an embodiment of the present invention.

FIG. 1 is a schematic drawing showing the configuration of the horizontal axis wind turbine of an embodiment of the present invention. As shown in FIG. 1, the horizontal axis wind turbine 10 comprises a rotor 1 to which at least two blades 6 are attached radially from a hub 7, a nacelle 2 wherein the rotor 1 is supported rotatably through a main axis (not shown in the figure) that extends in essentially the horizontal direction, to which the hub 7 is attached, and a tower 3 that supports the nacelle 2 rotatably in the yaw direction, and which is disposed in essentially the vertical direction.

The horizontal axis wind turbine 10 is controlled so that it receives wind 8 from the nacelle 2 side, and the rotor 1 is located on the downwind side of the nacelle 2.

Moreover, an anemometer 4 is placed on the nacelle 2, and that anemometer 4 measures the wind speed with the nacelle 2 located on the upwind side of the rotor 1. Furthermore, an acceleration sensor 5 is fixed to the nacelle 2. The acceleration sensor 5 detects the acceleration of the nacelle 2 in the main-axis direction of the nacelle 2 (direction perpendicular to the rotor).

Figure 2:
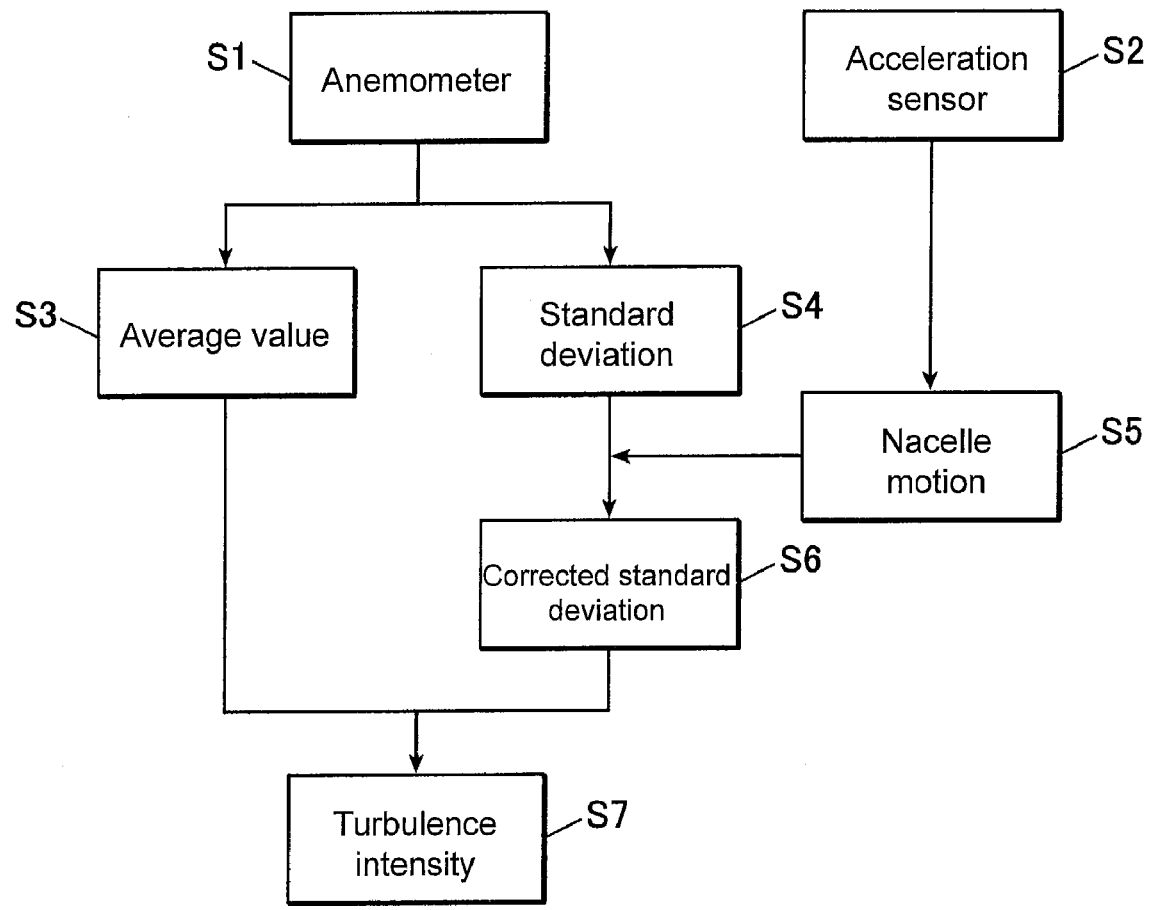
FIG. 2 is a flowchart of the method for measuring turbulence intensity of an embodiment of the present invention.

FIG. 2 is a flowchart of the method for measuring turbulence intensity of an embodiment of the present invention. The flow of this method is summarized below with reference to this flowchart.

First, measurement is performed over a set period of time, and the measurement values that are obtained simultaneously from the anemometer 4 and acceleration sensor 5 at a specified sampling rate (for example, 2 Hz) are stored as a database (steps S1, S2).

Next, based on the data obtained from the anemometer 4, the average value of the data for a continuous specified time period (for example, 10 minutes) is calculated (step S3), and the standard deviation is found (step S4).

Moreover, based on the acceleration data that was obtained in step S2, the standard deviation of the velocity of the nacelle 2 over the same time period as the aforementioned specified time period is found (step S5).

Next, the standard deviation that was calculated in step S4 is corrected by the standard deviation that was calculated in step S5 to obtain a corrected standard deviation (step S6).

Finally, the corrected standard deviation that was calculated in step S6 is divided by the average value that was calculated in step S3, with the result taken to be the intensity of the turbulence (step S7). The turbulence intensity that was calculated in step S7 becomes the absolute turbulence intensity that includes the effect of the movement of the nacelle.

An experimental implementation of this method will be disclosed below. In the explanation below, conversion is performed using a reference mast, and correction is performed using the acceleration sensor 5, to calculate the value of the absolute turbulence intensity of the airflow to the rotor.

A horizontal axis wind turbine 10 having a rotor diameter of 80 m was installed on the shore where there were few protruding landforms and no large obstacles, and a reference mast (not shown in the figure) was installed at a location separated 174 m along the shore from the horizontal axis wind turbine 10. The wind direction and wind speed were measured at the reference mast at a height of 60 m above the ground, which was nearly the same height as the hub 7 of the horizontal axis wind turbine 10.

Taking into consideration the relative position of the reference mast and the horizontal axis wind turbine 10, and the interference from surrounding wind turbines, data was processed, where the wind entering a range having a 60-degree central angle on the sea side of the horizontal axis was taken to be a sea wind, and wind entering a range having a 60-degree central angle on the land side was taken to be a land wind. In checking with the IEC61400-12 international standards related to the measurement of wind turbine performance, no site calibration was required, or in other words, in the case of a suitable wind direction, the site was such that the mast wind speed could be regarded as being the same as the hub wind speed.

The data used in this experiment was the nacelle wind speed, yaw angle, nacelle azimuth angle, and output of the wind turbine 10, and the wind direction and wind speed at 60 m on the reference mast, with a sampling frequency of 2 Hz.

Next, the measurement results are given.

[Measurement of the Correlation with the Reference Mast]

Figure 3:
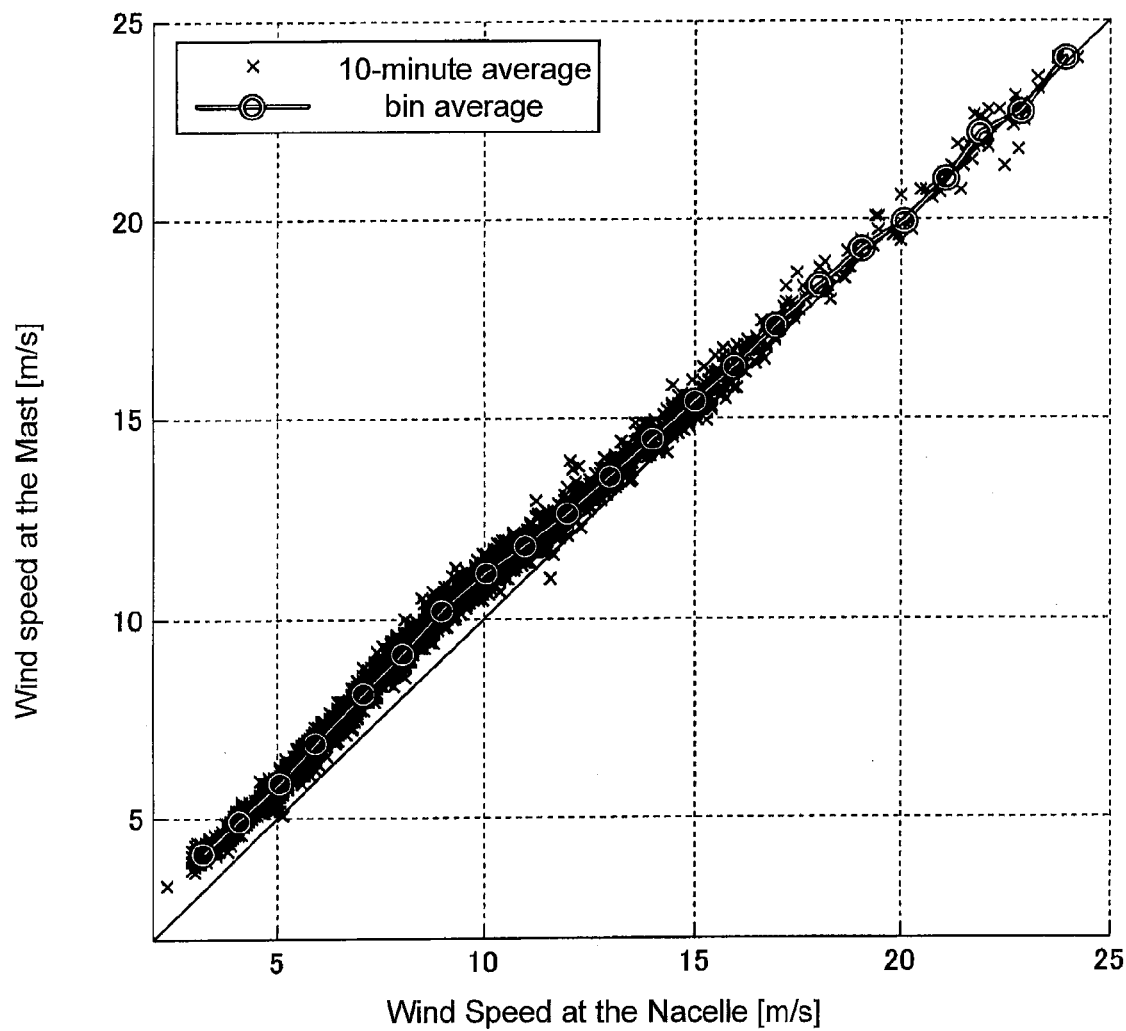
FIG. 3 is a graph showing the correlation in a sea wind between the 10-minute average wind speed of the reference mast and nacelle anemometers in terms of the bin 90% value in an embodiment of the invention.
Figure 4:
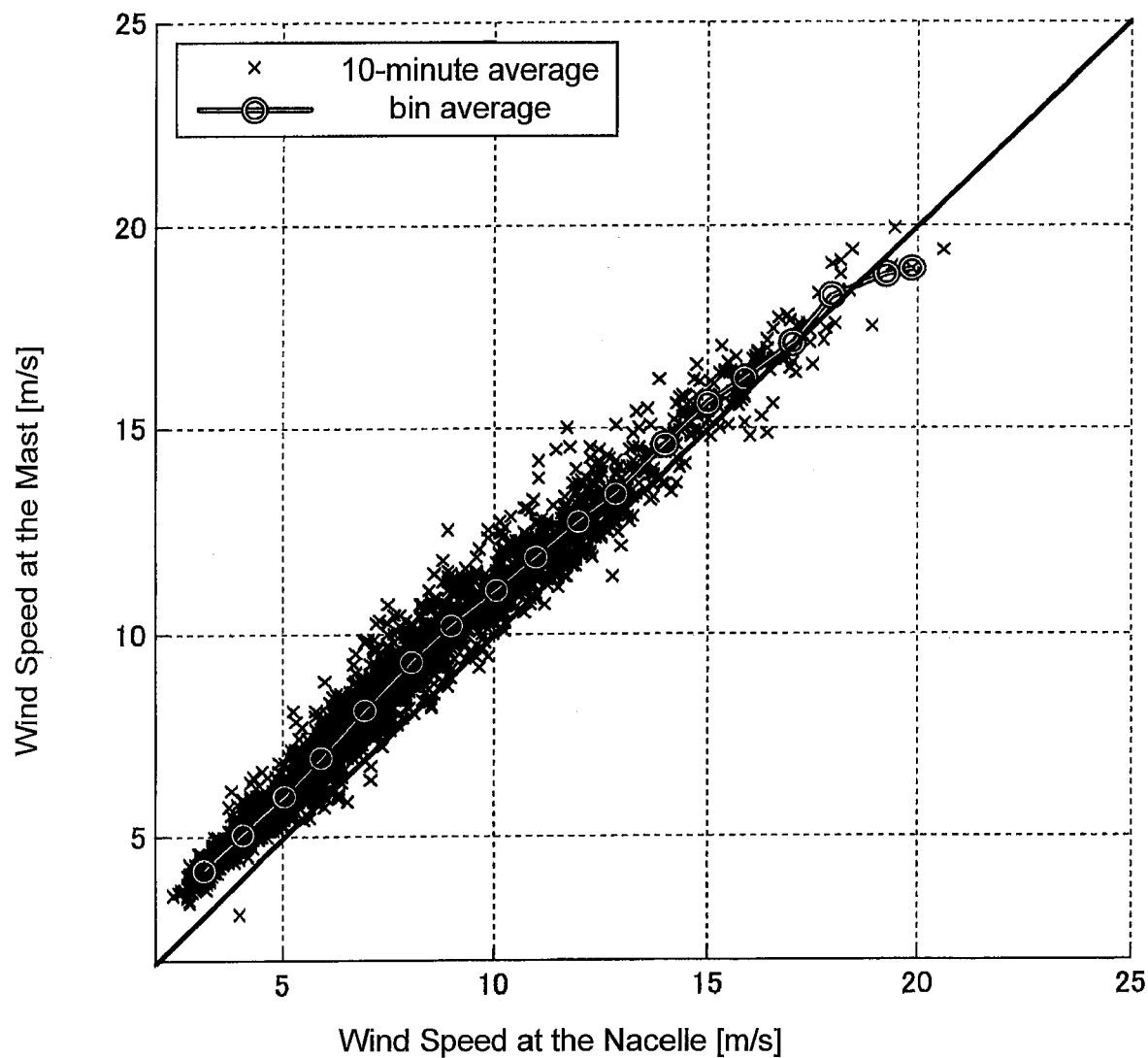
FIG. 4 is a graph showing the correlation in a land wind between the 10-minute average wind speed of the reference mast and nacelle anemometers in terms of the bin 90% value in an embodiment of the invention.

FIG. 3 and FIG. 4 use the bin average to show the correlation between the 10-minute average wind speed of the nacelle anemometer 4 and the reference mast in a sea wind and land wind. Generally, the nacelle anemometer value tends to decrease due to the effect of the rotor thrust, and tends to increase due to the effect of the low thrust region at the center of the rotor and the effect of the nacelle; where in these measurement results, the nacelle anemometer shows values that are about 1 m/s lower than those of the reference mast in a wind speed region that is lower than the rated wind speed. This region corresponds to the region of optimum efficiency of the wind turbine, or in other words, the region where the wind turbine operates with a relatively large thrust coefficient.

Moreover, at a wind speed of 16 to 20 m/s, both matched fairly well. However, this region corresponds to the region where the wind turbine reaches the rated output and operates at a lower efficiency and thrust coefficient. It is estimated that this correlation will change due to the average blowing angle. However, in the case of this site, the wind is regarded to be a horizontal wind from the measurement results of the three-dimensional wind conditions.

When data is gathered for a fixed zone (bin), the average value for that bin is called the bin average, and the value at 90% of the values from the smallest value is called the bin 90% value. In the case of finding the turbulence intensity for a wind speed bin having a 1 m/s width, data is collected for wind speeds, for example, from 5.5 to 6.5 m/s, where the average value of turbulence intensity for that data becomes the bin average, and the value at 90% of the values from the smallest value is the bin 90% value for the turbulence intensity.

[Measuring the Turbulence Intensity]

Figure 5:
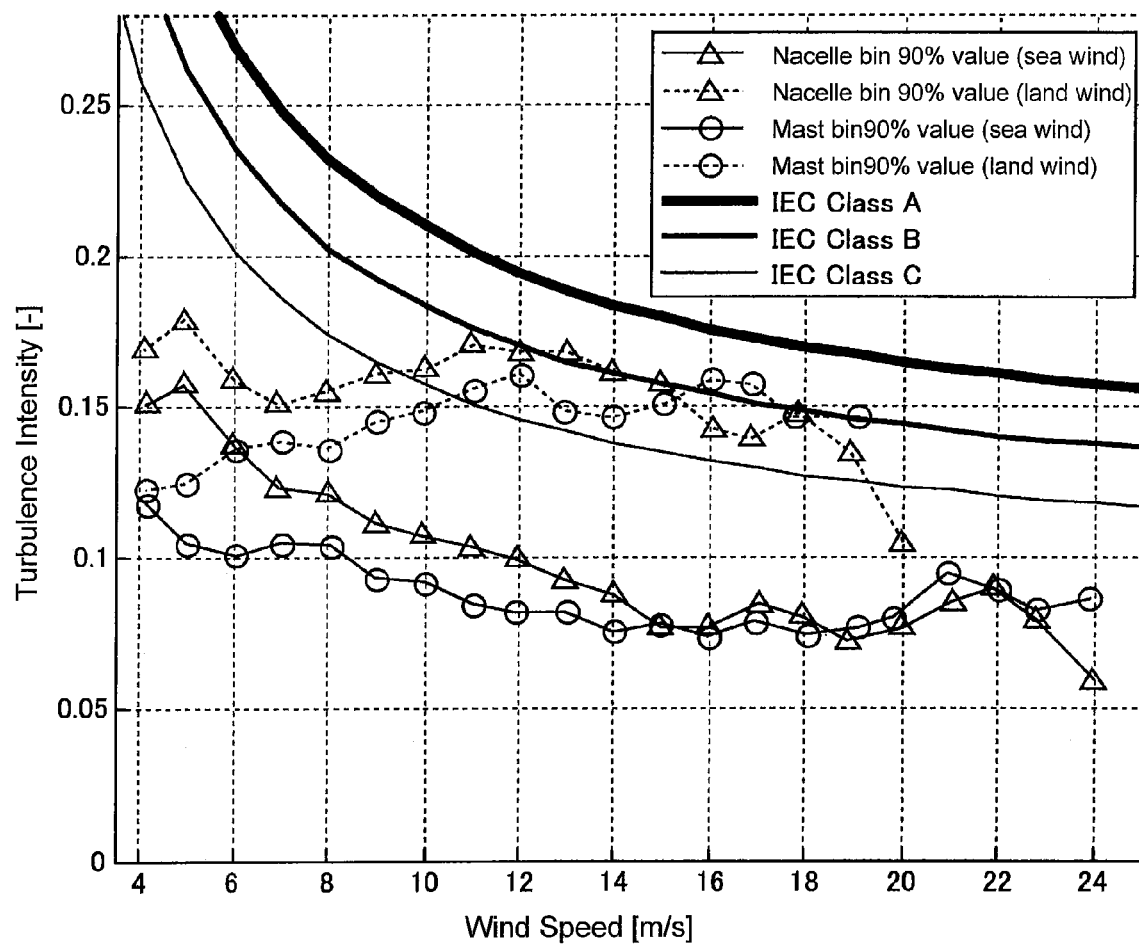
FIG. 5 is a graph showing the turbulence intensity (bin 90% value) with respect to the wind speed of a sea wind and land wind at the nacelle and reference mast in an embodiment of the invention.

FIG. 5 shows the turbulence intensity (bin 90% value) with respect to the wind speed of a sea wind and land wind at the nacelle and reference mast. This measurement takes the average value and standard deviation found in steps S3 and S4 to be the average value and standard deviation over 10 minutes. The plurality of 10-minute average values that enter the range at each 1 m/s on the horizontal axis are arranged in order from the smallest value, and the value that corresponds to the value at 90% of the values (bin 90% value) is calculated, as indicated by the o marks in FIG. 5. This corresponds to the nacelle reference turbulence intensity.

This turbulence intensity shows lower values as compared to the turbulence intensity that corresponds to wind speed classes 1(A) to 3(C) of the IEC61400-1, ed. 3. It is shown that a sea wind has a tendency similar to the IEC turbulence intensity. However, as the wind speed increases for a land wind, the turbulence intensity has a tendency to increase. When compared with a land wind, the turbulence intensity of a sea wind is remarkably low.

FIG. 5 shows the turbulence intensity for a wind speed according to the nacelle anemometer 4 together with the bin 90% value of the mast measurement values. The horizontal axis is converted to the mast wind speed according to the correlation given in FIG. 3 and FIG. 4. The values generally match for both a sea wind and land wind; however, the nacelle reference turbulence intensity value is a little higher value.

Figure 6:
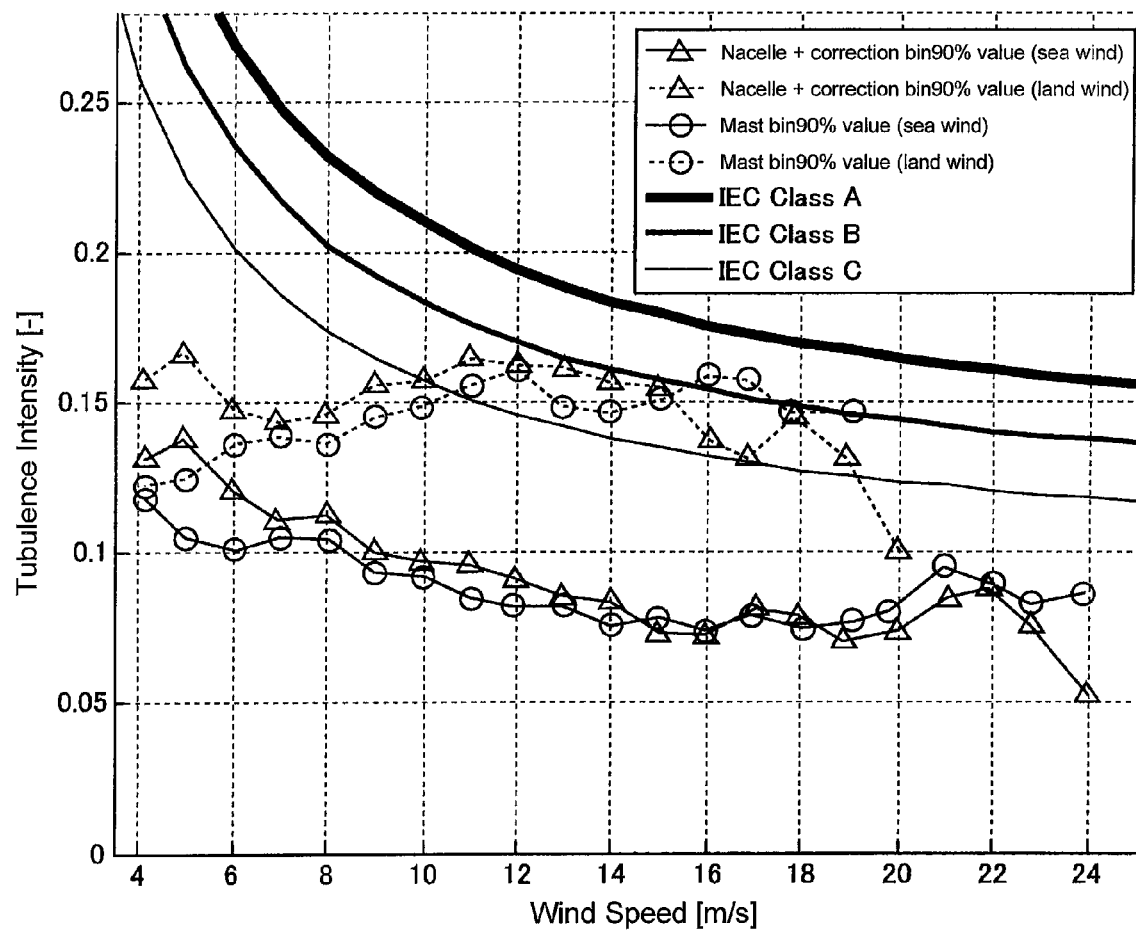
FIG. 6 is a graph showing the turbulence intensity (bin 90% value) with respect to the wind speed of a sea wind and land wind at the nacelle after correction and reference mast in an embodiment of the invention.

Next, the turbulence intensity from the nacelle anemometer 4 is corrected for nacelle motion. Acceleration data that is measured by the acceleration sensor 5 of the nacelle 2 is broken down according to frequency, and long frequency components of 1 minute or greater, which are thought to be affected little by disturbances, are removed. Moreover, for each frequency component, the velocity is derived from the acceleration, and the standard deviation of the nacelle velocity is found by integrating the power spectral density of the velocity over the entire frequency domain. When finding the turbulence intensity of the nacelle, the standard deviation of the nacelle wind speed is corrected by the standard deviation of the nacelle velocity. The analysis results are shown in FIG. 6, and the analysis flow is as shown in FIG. 2. The horizontal axis of FIG. 6 is converted to the mast wind speed according to the correlation given in FIG. 3 and FIG. 4. By removing the effect of the nacelle motion, the value becomes closer to that of the mast measurement value.

With the process described above, it was shown that it is possible to measure the turbulence intensity using the nacelle anemometer 4 and acceleration sensor 5. The correlation shown in FIG. 3 and FIG. 4 is effective at a location where the wind is nearly a horizontal wind. However, when the three-dimensional nature of the wind is more significant, particularly, since it can be assumed that interference from the nacelle varies, it must be noted that the correlation described above cannot be applied as is.

The equations that are used in the example calculation process that was applied in the experimental implementation of the invention described above will be explained.

First, the process for calculating the standard deviation $\sigma v$ of the nacelle velocity will be explained. As shown by Equation 1, Fourier transformation is performed to broken-down time data a(t) of the nacelle acceleration that is divided into 10-minute units as described above. $A(\omega)$ corresponds to the power spectral density of the nacelle acceleration. Here, $\omega$ is the angular velocity.

$$\underset{\uparrow\text{— Fourier transformation}}{F(a(t))} = A(\omega) \qquad \text{[Equation 1]}$$

Next, the amplitude Cai of the frequency ($\omega i$) component of the nacelle acceleration is found from Equation 2 (i is an integer).

$$Cai = \sqrt{A(\omega i) \times \Delta \omega i} \qquad \text{[Equation 2]}$$

Next, the amplitude Cvi of the frequency ($\omega i$) component of the nacelle velocity will be found from Equation 3.

$$Cvi = Cai/\omega i \qquad \text{[Equation 3]}$$

Next, the power spectral density $V(\omega)$ of the nacelle velocity will be found from Equation 4.

$$V(\omega i) = Cvi^2/\Delta \omega i \qquad \text{[Equation 4]}$$

Finally, the standard deviation $\sigma v$ of the nacelle velocity is found from Equation 5.

$$\sigma v = \sqrt{\int_{\omega 0}^{\infty} V \, d\omega} \qquad \text{[Equation 5]}$$

The standard deviation $\sigma v$ of the nacelle velocity that is obtained as described above is applied as shown in FIG. 7.

In other words, based on the wind speed data that was obtained from the anemometer, statistical processing is performed in 10-minute units as described above to obtain the average value of the wind speed ($V_N$) and the standard deviation $\sigma N$, and taking the absolute value of the difference between the standard deviation of the wind speed $\sigma N$ and the standard deviation of the nacelle velocity $\sigma v$ as the corrected standard deviation $\sigma c$, this corrected standard deviation $\sigma c$ and the average value of the wind speed ($V_N$) are both converted by the correlation function $\Phi$ of the nacelle velocity and reference mast to obtain corrected and converted standard deviation $\sigma H$ and converted average wind speed ($\overline{V}_H$). The turbulence intensity IH is then obtained by dividing the corrected and converted standard deviation $\sigma H$ by the converted average wind speed ($\overline{V}_H$).

Figure 7:
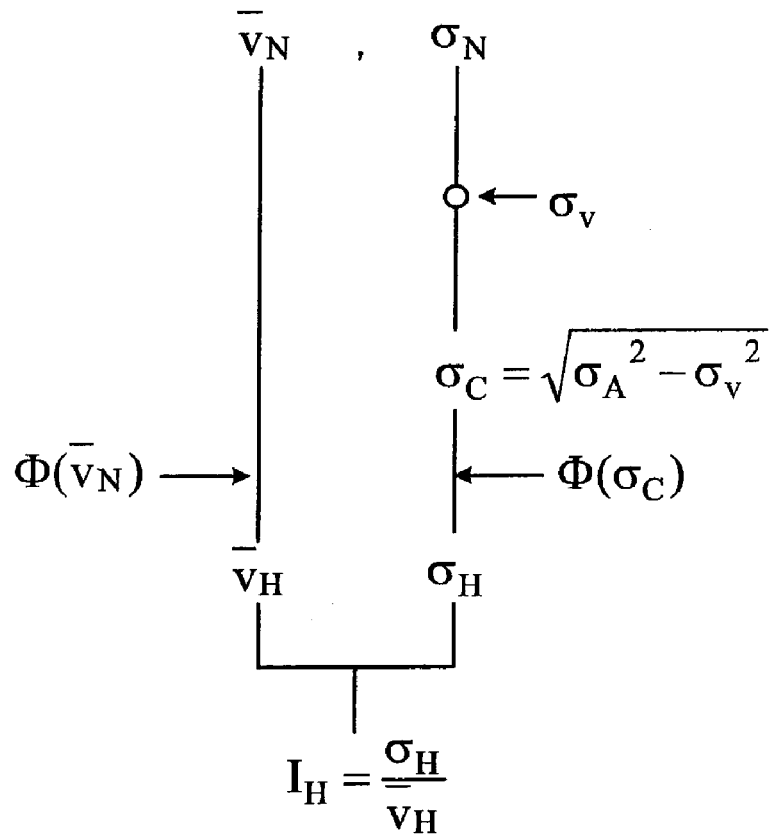
FIG. 7 is a flowchart showing the calculation process that is used in an experimental implementation of the present invention.
Figure 9:
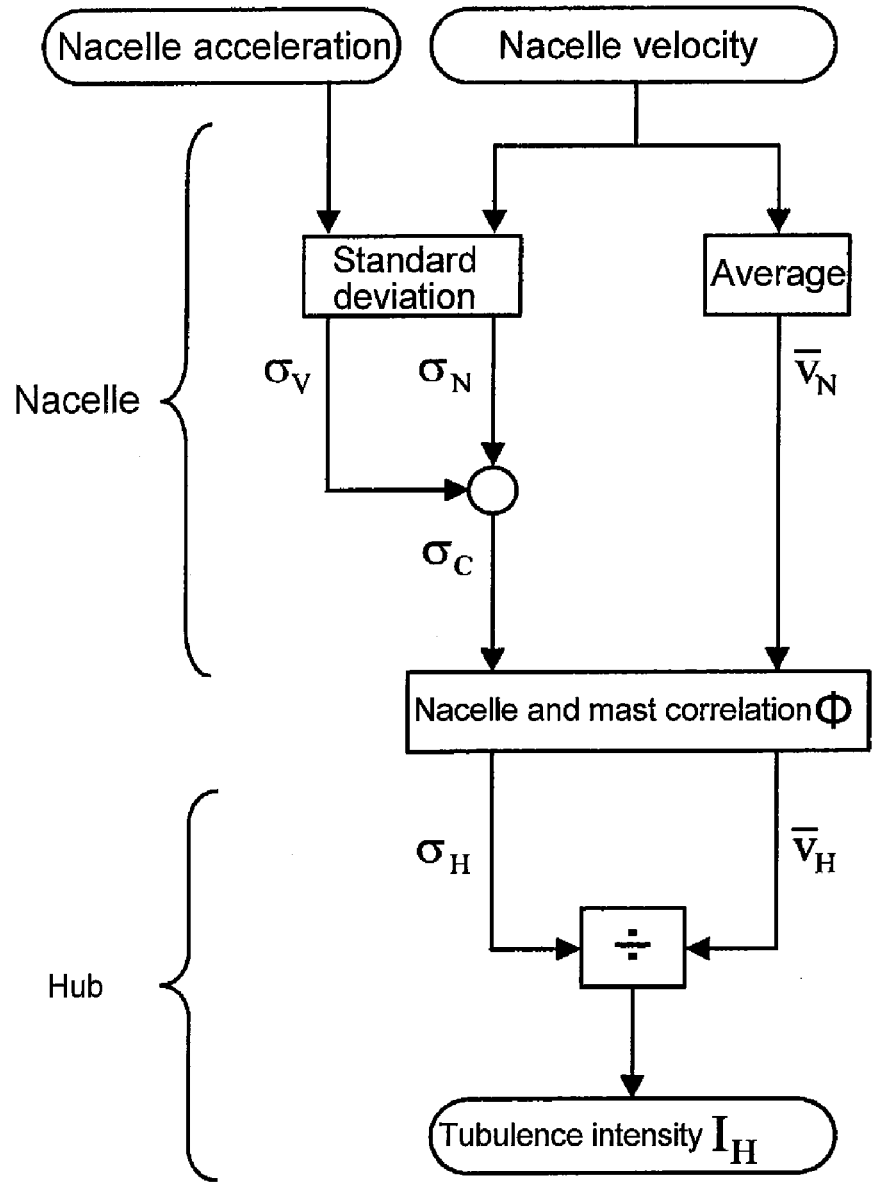
FIG. 9 is a flowchart of a method for measuring the turbulence intensity in an experimental implementation of the present invention.

Therefore, by combining the processing shown in the charts of FIG. 2 and FIG. 7, the chart shown in FIG. 9 is obtained.

Figure 8:
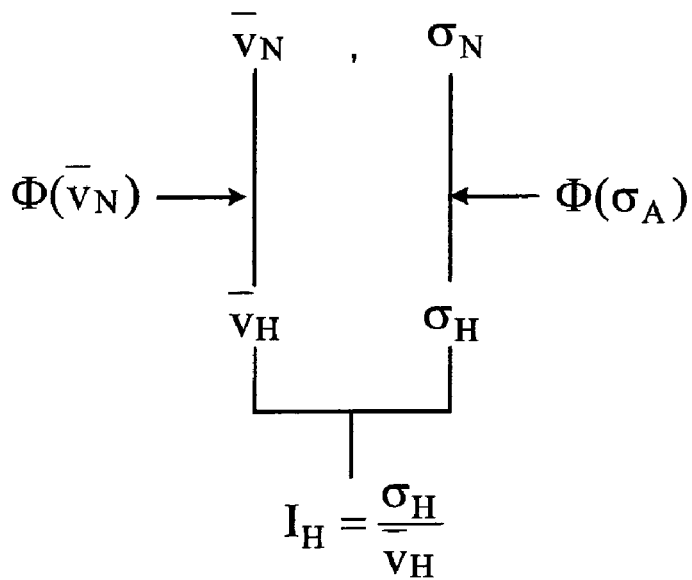
FIG. 8 is a flowchart showing the calculation process of a comparative example in which an acceleration sensor was used and in which correction was not performed.

An example of the flow for calculating the turbulence intensity by performing conversion using the reference mast without performing correction using the acceleration sensor is shown in FIG. 8.

By applying the present invention as described above, there is little effect from the rotor, and by considering the effect from the movement of the nacelle, it is possible to obtain the turbulence intensity more accurately.

By accurately obtaining the turbulence intensity, it becomes possible to more accurately estimate fatigue damage, and thereby more accurately evaluate the durability over the expected life of the wind turbine. When it is known that there is insufficient durability, it possible to take early measures. In other words, when the turbulence intensity exceeds the design values, by applying the present invention and accurately obtaining the turbulence intensity, it is possible to more accurately know the fatigue damage over the expected life of the wind turbine. In the case where the turbulence intensity exceeds the design value, by taking measures, such as operating the wind turbine with restrictions to make the turbulence intensity less than the design value, it is possible prevent unforeseeable collapse or the like.

By storing wind speed data from the nacelle anemometer and nacelle acceleration data at each location and accurately identifying the turbulence intensity by using the present invention, it is possible to accurately know the performance of the wind turbine with respect to the turbulence intensity, and thus improve the accuracy before construction of the estimated amount of power generation.

In the embodiment described above, an acceleration sensor 5 was attached to the nacelle 2. However, as long as it is possible to know the acceleration of the anemometer, the acceleration sensor can be attached to the tower 3.

Moreover, in the embodiment described above, an acceleration sensor 5 was used, however, as long as it is possible to obtain the velocity of the anemometer that is required for correction, it is possible to use a velocity sensor or position sensor instead of the acceleration sensor.

In the embodiment described above, the case of using a downwind type of wind turbine was explained, however, the present invention could also be applied to an upwind type of wind turbine. In that case, the anemometer measures the wind speed by extending an arm out from the tip end of the hub toward the upwind side, or measures the hub wind speed by a means such as placing a pitot tube on the hub.

What is claimed is:

1. A method for measuring a turbulence intensity of a horizontal axis wind turbine, comprising the steps of:
    obtaining measurement values from both an anemometer that is located on an upwind side of a rotor of said horizontal axis wind turbine and a sensor that measures a motion of said anemometer; and
    in a process of calculating the turbulence intensity based on the measurement value of a wind speed by said anemometer, removing, based on the measurement value from the sensor, a portion of change in the measurement value of the wind speed from said anemometer caused by the motion of said anemometer and calculating the turbulence intensity.

2. The method for measuring the turbulence intensity of the horizontal axis wind turbine of claim 1, wherein
    said horizontal axis wind turbine is a downwind type of wind turbine including a nacelle that is located on the upwind side of the rotor, and
    said anemometer is located on said nacelle.

3. The method for measuring the turbulence intensity of the horizontal axis wind turbine of claim 2, wherein
    the sensor that measures the motion of said anemometer is an acceleration sensor that is located on said nacelle.

4. The method for measuring the turbulence intensity of the horizontal axis wind turbine of claim 3 comprising the steps of:
    obtaining wind velocity data from said anemometer and acceleration data from said acceleration sensor at a specified sampling rate over a specified time period;
    calculating an average value and a standard deviation of said wind speed data for said specified time period;
    calculating a standard deviation of the speed of the anemometer at said specified time period based on said acceleration data;

performing a correction by subtracting the standard deviation of the speed of said anemometer from the standard deviation of said wind speed data to obtain a corrected standard deviation; and dividing said corrected standard deviation by the average value of said wind speed data and taking the result to be the value of said turbulence intensity.

5. The method for measuring the turbulence intensity of the horizontal axis wind turbine of claim 1, wherein said horizontal axis wind turbine is an upwind type of wind turbine including a nacelle that is located on a downwind side of the rotor.

* * * * *